(12) United States Patent
Grundmann et al.

(10) Patent No.: US 8,177,425 B2
(45) Date of Patent: May 15, 2012

(54) TEMPERATURE-MEASURING DEVICE

(75) Inventors: Wolfgang Grundmann, Birkenwerder (DE); Bernhard Ostrick, Teltow (DE); Peter Balzer, Berlin (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 12/348,713

(22) Filed: Jan. 5, 2009

(65) Prior Publication Data

US 2009/0193887 A1    Aug. 6, 2009

Related U.S. Application Data

(63) Continuation of application No. PCT/DE2007/001059, filed on Jun. 15, 2007.

(30) Foreign Application Priority Data

Jul. 6, 2006   (DE) .................. 10 2006 031 343

(51) Int. Cl.
*G01K 1/00*   (2006.01)
*G01K 7/00*   (2006.01)

(52) U.S. Cl. ......... 374/147; 374/208; 374/183; 374/185
(58) Field of Classification Search ............... 374/208, 374/147, 183, 185
See application file for complete search history.

(56) References Cited

U.S. PATENT DOCUMENTS

| | | | | | |
|---|---|---|---|---|---|
| 1,758,532 | A | * | 5/1930 | Phinney ........................ | 374/148 |
| 3,167,733 | A | * | 1/1965 | Di Noia ......................... | 338/28 |
| 3,848,466 | A | * | 11/1974 | Dial et al. ..................... | 374/147 |
| 3,881,181 | A | * | 4/1975 | Khajezadeh .................. | 257/467 |
| 3,897,272 | A | * | 7/1975 | Medlar ......................... | 136/230 |
| 5,040,901 | A |   | 8/1991 | Suzuki | |
| 5,829,880 | A |   | 11/1998 | Diedrich | |
| 5,993,061 | A | * | 11/1999 | Drouet ......................... | 374/208 |
| 7,249,885 | B2 | * | 7/2007 | Van Den Ende et al. ..... | 374/147 |
| 2004/0190590 | A1 | * | 9/2004 | Wienand et al. .............. | 374/147 |

FOREIGN PATENT DOCUMENTS

| | | |
|---|---|---|
| CN | 2757103 Y | 2/2006 |
| DE | 26 45 626 | 5/1977 |
| DE | 196 08 675 C2 | 9/1997 |
| DE | 299 14 553 U1 | 12/1999 |
| DE | 103 40 636 B3 | 1/2005 |
| EP | 0 364 579 A1 | 4/1990 |
| EP | 0 794 417 A1 | 9/1997 |
| JP | 59-184840 U | 12/1984 |
| JP | 63-253223 A | 10/1988 |
| JP | 2002-5757 A | 1/2002 |
| JP | 2004-361217 A | 12/2004 |
| JP | 2006-58231 A | 3/2006 |
| WO | WO 02/071551 A1 | 9/2002 |

* cited by examiner

*Primary Examiner* — Lisa Caputo
*Assistant Examiner* — Mirellys Jagan
(74) *Attorney, Agent, or Firm* — Slater & Matsil, L.L.P.

(57) ABSTRACT

A temperature-measuring device with a sensing head and a pipe piece is disclosed. The sensing head is embedded in the pipe piece. The pipe piece is provided for conducting a medium whose temperature is detected by the sensing head.

22 Claims, 4 Drawing Sheets

TEMPERATURE-MEASURING DEVICE

This application is a continuation of co-pending International Application No. PCT/DE2007/001059, filed Jun. 15, 2007, which designated the United States and was not published in English, and which claims priority to German Application No. 10 2006 031 343.7 filed Jul. 6, 2006, both of which applications are incorporated herein by reference.

BACKGROUND

Temperature probes are known, e.g., from German patent publication DE 10340636 B3.

SUMMARY

In one aspect, the present invention specifies a measurement device that is suitable for detecting the temperature of a medium flowing in a line system. For example, a temperature-measuring device with a sensing head and a tube piece is specified in which the sensing head is embedded and preferably integrally cast. The tube piece is provided for conducting a medium whose temperature is to be detected by means of the sensing head.

The sensing head is advantageously embedded in the walls, i.e., in the casing of the pipe piece.

The medium that is to be subjected to a temperature measurement is advantageously a medium flowing through the pipe piece, such as, e.g., air, gas, vapor, or a liquid. The flowing liquid can comprise, e.g., water, oil, fuel, lye, etc.

In the region of the sensing head, the inside of the pipe piece has, in particular, no interfaces to be sealed, i.e., no boundary surfaces between two bordering parts. An interface-free integration of the sensing head in a part of a line system allows a non-invasive temperature measurement of a medium flowing through the line system. Such a measurement is advantageous, because here, in contrast to an invasive temperature measurement in which a sensing head is passed through the wall of the line system, no leakage can be produced.

The pipe piece advantageously has a projecting section facing inward in which at least one part of the sensing head is enclosed. However, the sensing head can also be enclosed in a region of the wall of the pipe piece that has no projecting section extending inward.

The pipe piece can have catch devices that are arranged on the end and that allow, in particular, the attachment of hoses of a line system. For example, the pipe piece of the specified measurement device can be arranged between two hoses through which the cooling water flows for cooling a motor.

The pipe piece can also be formed from a material with elastic properties. A pipe piece constructed in this way can be used as a seal between two pipes.

The pipe piece can have, on the end, a larger diameter than in the bordering regions, a chamfered end, and/or ribbing.

The pipe piece is advantageously connected monolithically to a plug device in which electrical feed lines are integrated that are connected to the sensing head in a conductive way. Through the monolithic connection of the pipe piece and the plug device, the mounting of the plug device on the pipe piece by means of holding devices can be eliminated.

In the pipe piece, advantageously at least one heat-conducting body is embedded that touches the sensing head. The heat conductivity of the heat-conducting body exceeds that of the pipe piece.

The heat-conducting body is advantageously planar, in order to record and average the temperature of the medium flowing through the pipe at various positions of the pipe piece. The heat-conducting body is advantageously embedded in the pipe piece and arranged in the vicinity of the inner surface of the pipe piece. It is advantageous if the heat-conducting body follows at least one part of the pipe periphery and is constructed, e.g., like a ring or partial ring. The heat-conducting body can also extend, however, in the longitudinal direction of the pipe piece.

The heat-conducting body advantageously comprises metal. It can also, however, be constructed as an injection-molded piece, e.g., made from plastic that is filled with metal particles. Other materials with a high thermal conductivity are also suitable.

BRIEF DESCRIPTION OF THE DRAWINGS

Advantageous embodiments of the measurement device will be explained with reference to schematic figures that are not true to scale. Shown are.

Figure 1:
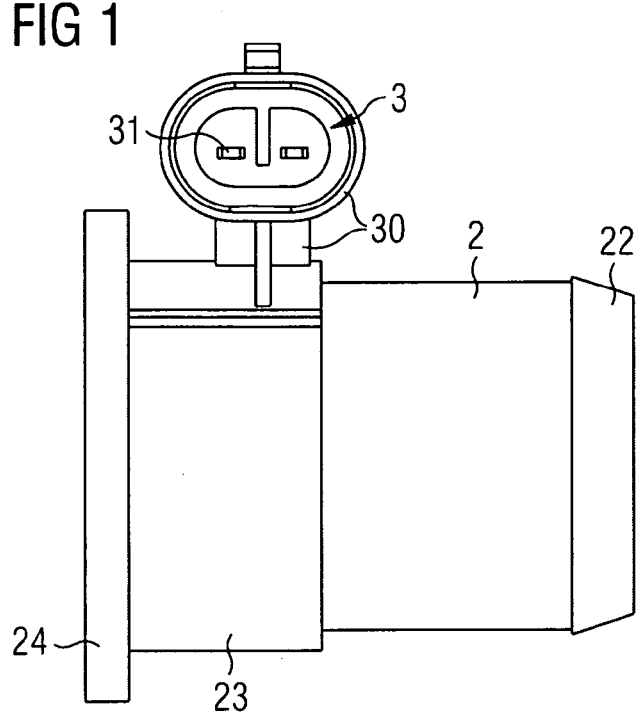
FIG. 1, shows in a side view, a measurement device with a pipe piece that is connected monolithically to a plug connection.

The following list of reference symbols can be used in conjunction with the drawings:
1 Sensing head
10 Heat-conducting body
11 Electrical feed lines
2 Pipe piece
21 Projecting section in which the sensing head 1 is enclosed
22 End region of the pipe piece 2
23 Region of the pipe piece 2 that includes the sensing head
24 Collar
241 Openings for receiving attachment elements
3 Plug connection
30 Housing of the plug connection 3
31 Electrical terminal
33 Base
39 Part of the housing 30

DETAILED DESCRIPTION

Referring to the drawings, the temperature-measuring device comprises a sensing head 1 that advantageously comprises an NTC sensor element, where NTC stands for Negative Temperature Coefficient. The temperature-measuring device further comprises a pipe piece 2 in which the sensing head 1 is enclosed. The sensing head 1 is advantageously encased in the body of the pipe piece such that no interfaces are produced. In particular, the inside of the pipe piece has no interfaces to be sealed between the pipe piece and the sensing element.

The sensing head 1 is soldered with electrical feed lines 11 that are connected conductively to the electrical terminals 31 of the temperature-measuring device. The feed lines 11 and the terminals 31 are integrated in a plug connection 3 that is molded before the forming of the pipe piece. The plug connection 3 comprises a housing 30 that is advantageously available as a molded part. In this housing, the feed lines 11 are passed through. In the housing 30 there is also at least one part of the terminals 31. The sensing head 1 can also be arranged partially in the housing 30 in one variant.

Figure 2:
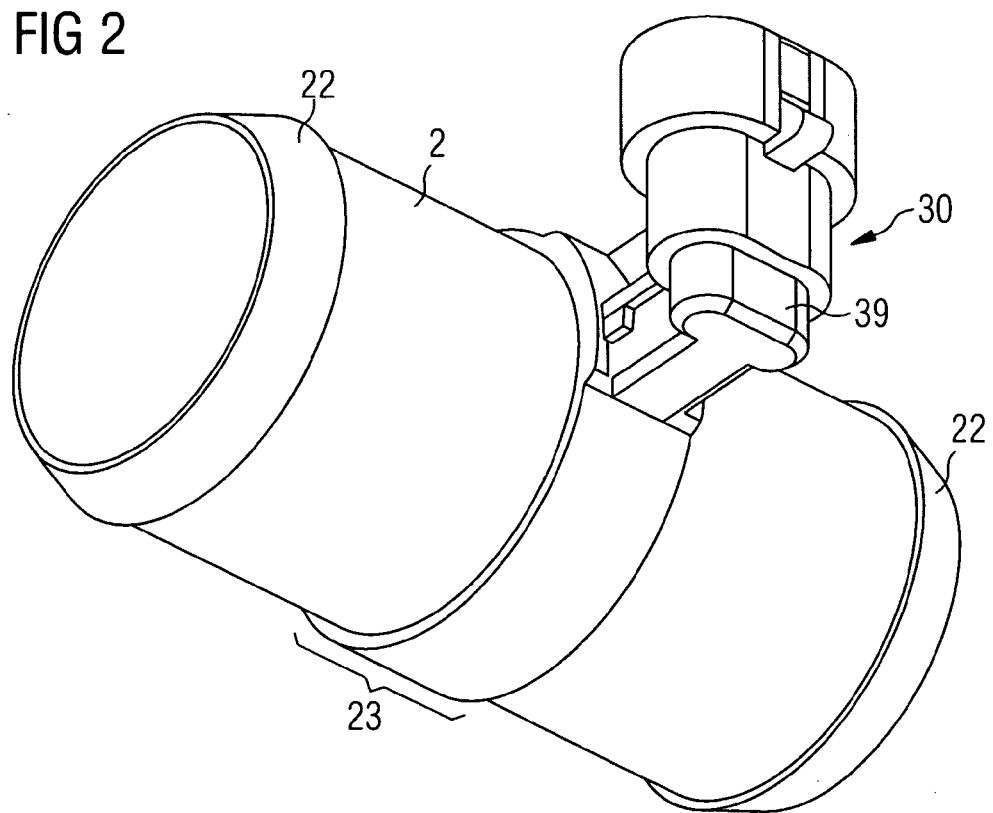
FIG. 2, shows in a perspective side view, the measurement device according to FIG. 1.
Figure 5:
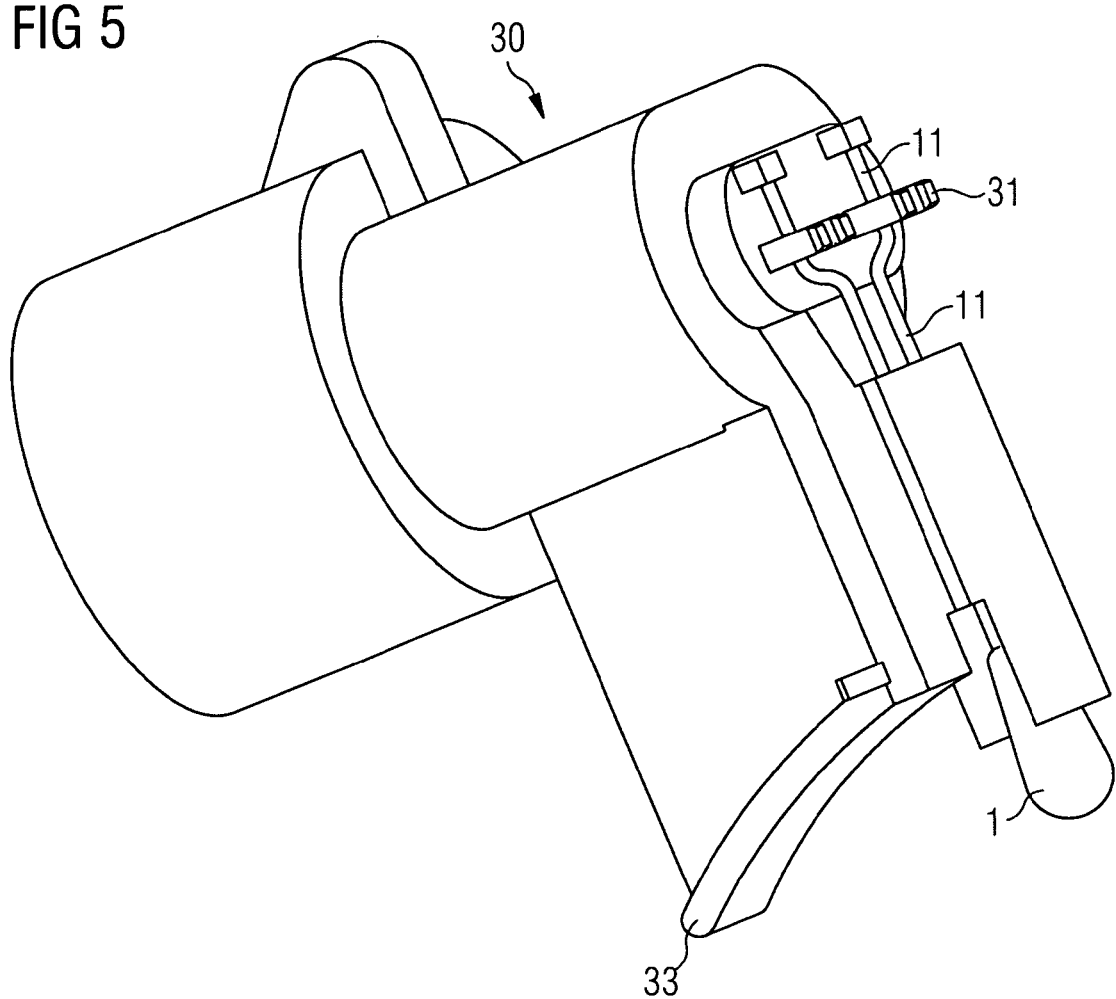
FIGS. 5, 6, show different perspective views of the housing of a plug connection connected to the sensing head.
Figure 6:
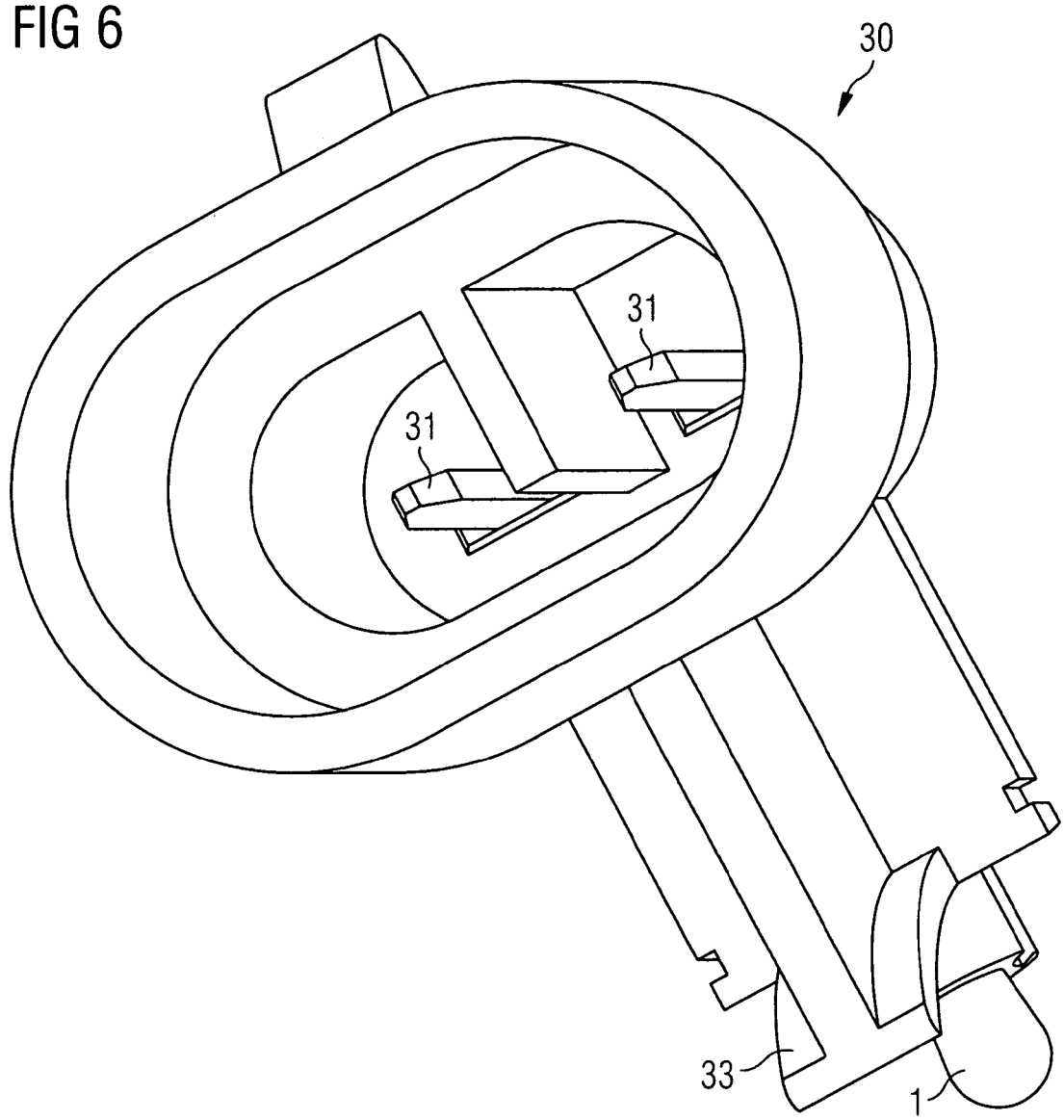

The housing 30 not yet integrated into the pipe piece 2 is shown in FIGS. 5 and 6. The feed lines 11 are exposed. The part 39 of the housing visible in FIG. 2 is produced together with the pipe piece 2, i.e., in the same processing step, wherein the feed lines 11 are embedded in a casting compound. The part 39 of the housing 30 and the pipe piece 2 are constructed in one piece.

The housing 30 of the plug connection 3 advantageously comprises a base 33 that is connected monolithically to the pipe piece 2. The base 33 has a curvature that advantageously follows a circular arc that results from the profile of the pipe piece 2.

The pipe piece 2 is advantageously produced as a molded part in a press or injection molding method, wherein the base 33 of the plug connection 3 is advantageously at least partially coated by the casting compound.

The plug connection 3 can be connected to another plug connection that is constructed complementary to it and that is connected conductively to a circuit for evaluating the measurement signals detected by the sensing head 1. The longitudinal axis of the plug connection 3 is arranged in the shown variants transverse to the longitudinal axis of the pipe piece 2. It can also be oriented, however, parallel or at an angle to the longitudinal axis of the pipe piece 2.

Figure 3:
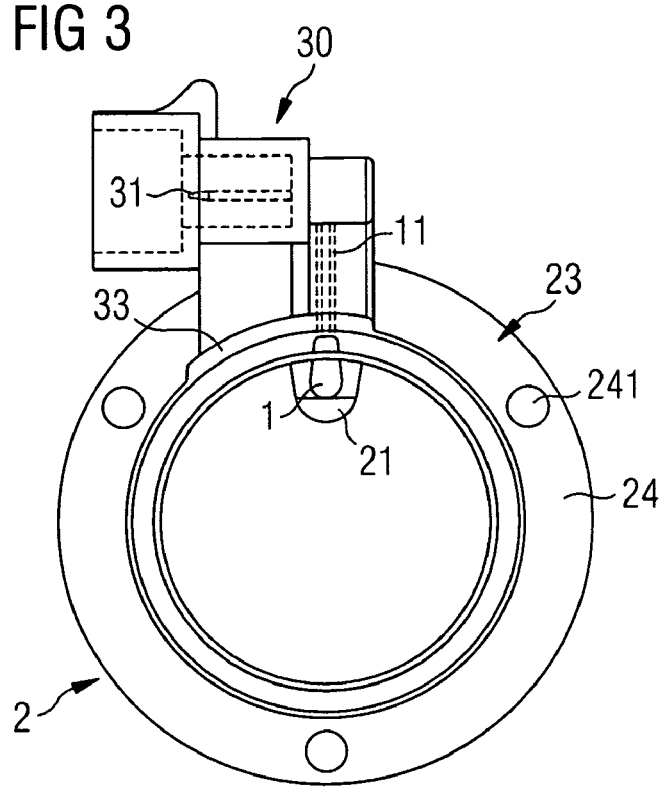
FIG. 3, shows in another view, a variant of the measurement device according to FIGS. 1 and 2 that has a sensing head encased in a projecting section of the pipe piece.

The sensing head 1 can be enclosed in the embodiment according to FIG. 3 in a projecting section 21 of the pipe piece 2 that extends into the inner opening of the pipe piece, but is nevertheless a component of the pipe piece.

Figure 4:
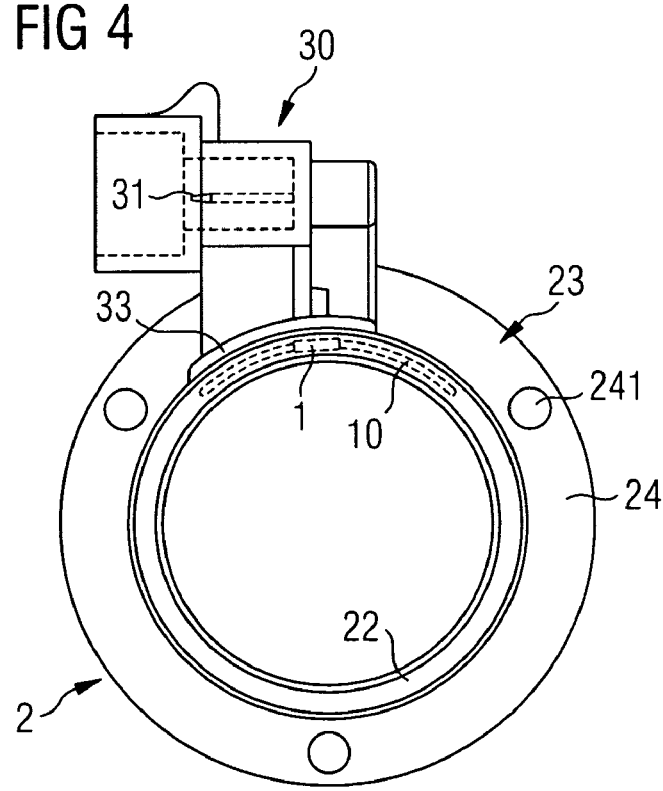
FIG. 4, shows in another view, a variant of the measurement device according to FIGS. 1 and 2 that has a sensing head encased in the pipe piece.

Alternatively, the sensing head 1 can be enclosed as in the embodiment according to FIG. 4 in the side wall of the pipe piece 2 that advantageously has no projecting sections in the region of the sensing head.

In the pipe piece 2, at least one good heat conducting body 10 advantageously made from metal can be embedded that touches the sensing head 1. A good heat conducting body is understood to be a body whose heat conductivity is greater than that of the surroundings (i.e., the pipe piece).

The heat-conducting body 10 is advantageously completely embedded in the wall of the pipe piece. The heat-conducting body 10 is planar, in this embodiment, constructed in the form of a partial ring. The heat-conducting body can also have the shape of a pot in which advantageously one part of the sensing head 1 is arranged.

The pipe piece 2 can be connected on both sides to additional pipes and is then a component of a line system for conducting a medium, advantageously flowing through the line system, whose temperature is to be measured. The medium can comprise a gas or a liquid.

The pipe piece can be used as a connecting piece on whose ends hoses are mounted. End-side regions 22 of the pipe piece 2 advantageously have catch devices.

The pipe piece 2 that includes the sensing head 1 has a thicker section in the region 23, because in this region advantageously one base of the plug connection 3 is encased.

The pipe piece 2 can have a collar 24 in which openings 241 for receiving attachment elements are arranged. Thus, the pipe piece can be mounted on a carrier

What is claimed is:

1. A temperature-measuring device comprising:
   a sensing head;
   a pipe piece, wherein the pipe piece comprises a material with elastic properties as a base material;
   wherein the sensing head is embedded in the pipe piece, the pipe piece being provided for conducting a medium whose temperature can be detected by the sensing head,
   wherein the sensing head is separated from the medium by a portion of the pipe piece and/or the pipe piece has an inside that is free from interfaces in a region of the sensing head; and
   at least one heat-conducting body embedded in the pipe piece and touching the sensing head, wherein the at least one heat-conducting body has a heat conductivity that exceeds a heat conductivity of the pipe piece, wherein the pipe piece comprises a tubular shape, and wherein the at least one heat-conducting body comprises an at least partially cylindrical surface form-fitted to the tubular shape of the pipe piece.

2. The temperature-measuring device according to claim 1, wherein the heat-conducting body is made from plastic that is filled with metal particles.

3. A temperature-measuring device comprising:
   a sensing head;
   a pipe piece,
   wherein the sensing head is embedded in the pipe piece, the pipe piece being provided for conducting a medium whose temperature can be detected by the sensing head,
   wherein the sensing head is separated from the medium by a portion of the pipe piece and/or the pipe piece has an inside that is free from interfaces in a region of the sensing head; and
   at least one heat-conducting body embedded in the pipe piece and touching the sensing head, wherein the at least one heat-conducting body has a heat conductivity that exceeds a heat conductivity of the pipe piece, the pipe piece comprises a tubular shape, and wherein the at least one heat conducting body comprises an at least partially cylindrical surface form-fitted to the tubular shape of the pipe piece.

4. The temperature-measuring device according to claim 3, wherein the pipe piece includes a projecting section that faces inward, at least one part of the sensing head being enclosed in the projecting section.

5. The temperature-measuring device according to claim 3, wherein the pipe piece has catch devices on an end.

6. The temperature-measuring device according to claim 3, further comprising a plug device and electrical feed lines, wherein the pipe piece is connected monolithically to the plug device and the electrical feed lines are integrated in the plug device and are electrically connected to the sensing head.

7. The temperature-measuring device according to claim 3, wherein the pipe piece has a larger diameter in a peripheral region than in bordering regions, the peripheral region including the sensing head.

8. The temperature-measuring device according to claim 3, wherein the pipe piece is an injection molded part.

9. The temperature-measuring device according to claim 3, wherein the sensing head comprises an NTC (negative thermal coefficient) element.

10. The temperature-measuring device according to claim 3, wherein the heat-conducting body comprises metal.

11. The temperature-measuring device according to claim 3, wherein the heat-conducting body is made from plastic that is filled with metal particles.

12. A temperature-measuring device comprising:
    a sensing head;
    a pipe piece, wherein the sensing head is embedded in the pipe piece, the pipe piece for conducting a medium whose temperature can be detected by the sensing head, wherein the sensing head is separated from the medium by a portion of the pipe piece;

a plug device connected monolithically to the pipe piece;

electrical feed lines integrated in the plug device, the electrical feed lines being electrically connected to the sensing head; and a heat-conducting body embedded in the pipe piece and touching the sensing head, wherein a heat conductivity of the heat-conducting body exceeds a heat conductivity of the pipe piece, wherein the pipe piece comprises a tubular shape, and wherein the heat-conducting body comprises an at least partially cylindrical surface form-fitted to the tubular shape of the pipe piece.

13. The temperature-measuring device according to claim 12, wherein the pipe piece has a projecting section that faces inward and in which at least one part of the sensing head is enclosed.

14. The temperature-measuring device according to claim 12, wherein an inside of the pipe piece is free from interfaces in a region of the sensing head.

15. The temperature-measuring device according to claim 12, wherein the pipe piece has catch devices on an end.

16. The temperature-measuring device according to claim 12, wherein the pipe piece has a larger diameter in a peripheral region than in regions bordering the peripheral region, the peripheral region including the sensing head.

17. The temperature-measuring device according to claim 12, wherein the pipe piece comprises a material with elastic properties as a base material.

18. The temperature-measuring device according to claim 12, wherein the pipe piece is an injection molded part.

19. The temperature-measuring device according to claim 12, wherein the sensing head comprises an NTC (negative thermal coefficient) element.

20. The temperature-measuring device according to claim 12, wherein the heat-conducting body has a substantially planar construction.

21. A temperature-measuring device comprising:

a sensing head;

a pipe piece,
wherein the sensing head is embedded in the pipe piece, the pipe piece being provided for conducting a medium whose temperature can be detected by the sensing head,
wherein the sensing head is separated from the medium by a portion of the pipe piece and/or the pipe piece has an inside that is free from interfaces in a region of the sensing head; and at least one heat-conducting body embedded in the pipe piece and touching the sensing head, wherein the at least one heat-conducting body has a heat conductivity that exceeds a heat conductivity of the pipe piece, wherein the pipe piece comprises an inner wall and a tubular shape, wherein the at least one heat-conducting body comprises a surface area facing the inner wall of the pipe piece and an at least partially cylindrical surface form-fitted to the tubular shape of the pipe piece and wherein the surface area of the at least one heat conducting body comprises a preferred direction.

22. The temperature-measuring device according to claim 21, wherein the heat-conducting body is constructed like a ring or partial ring.

* * * * *